May 31, 1932.  J. F. JOHNSON  1,860,779
DEVICE FOR CUTTING OFF THE END PORTIONS OF VEGETABLES
Filed July 30, 1928  2 Sheets-Sheet 1
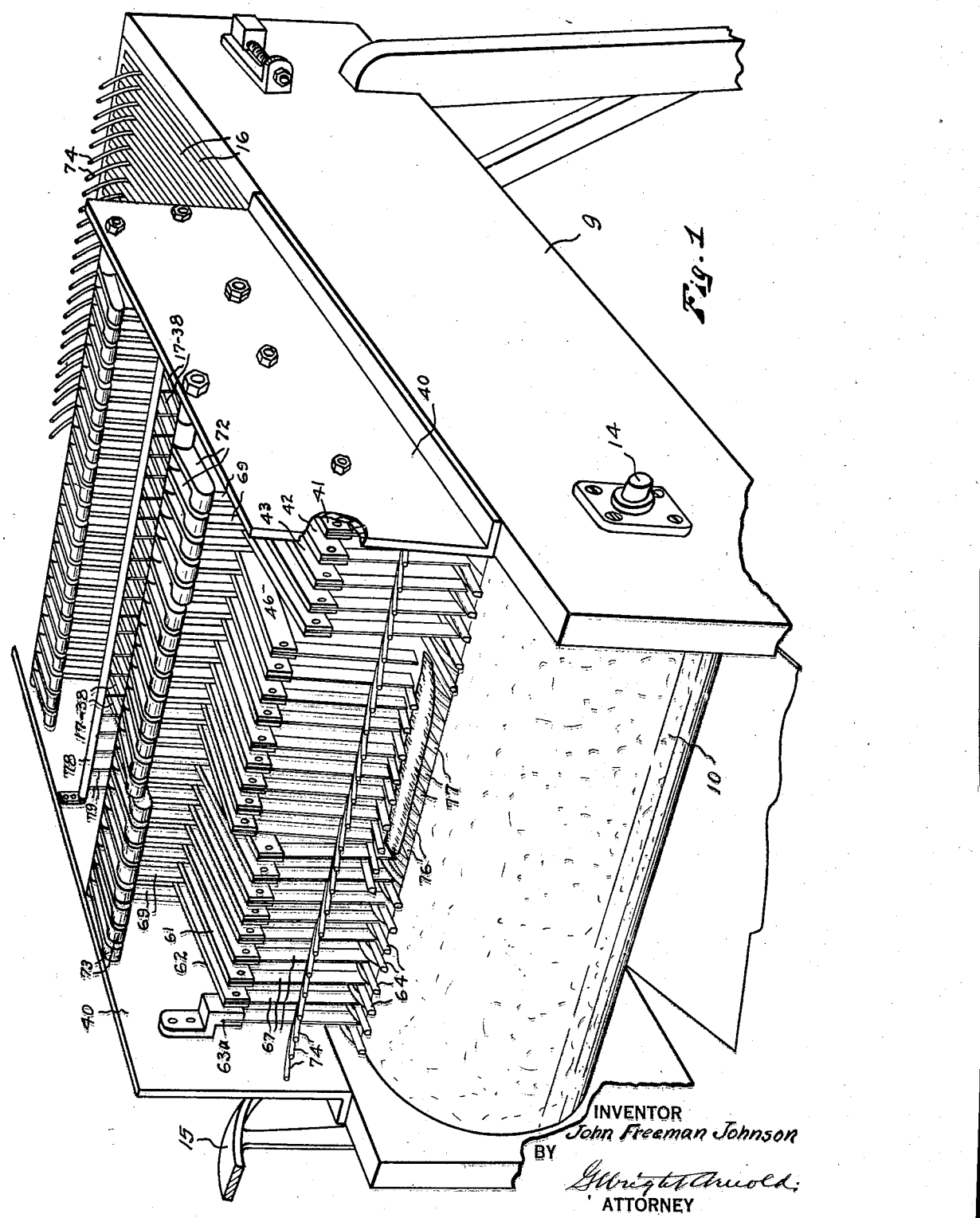
INVENTOR
John Freeman Johnson
BY
ATTORNEY

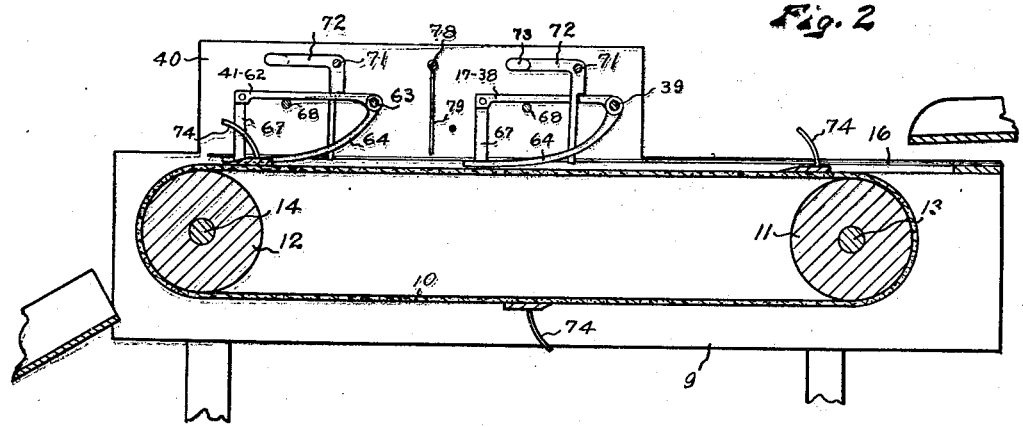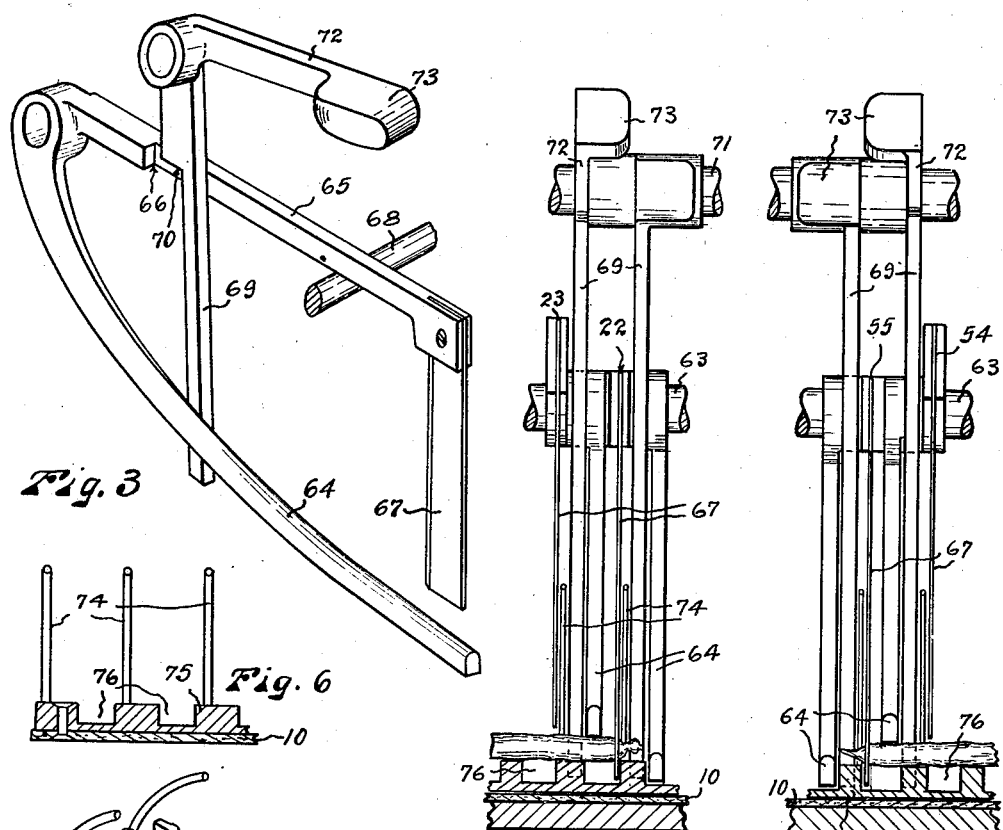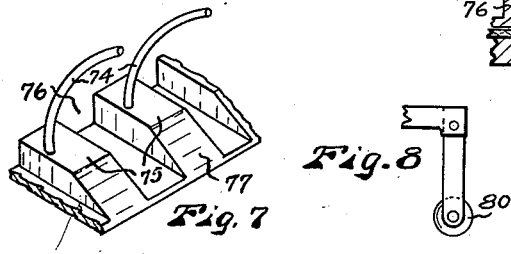

Patented May 31, 1932

1,860,779

UNITED STATES PATENT OFFICE

JOHN FREEMAN JOHNSON, OF BLAINE, WASHINGTON, ASSIGNOR OF ONE-HALF TO CLIFFORD K. McMILLIN, OF BELLINGHAM, WASHINGTON

DEVICE FOR CUTTING OFF THE END PORTIONS OF VEGETABLES

Application filed July 30, 1928. Serial No. 296,240.

My invention relates to a device for cutting off the end portions of vegetables. More particularly, my invention relates to a device for snipping off the ends of string beans.

While my invention will be described herein for purposes of clearness and definiteness of illustration with respect to this particular application of string bean snipping, yet it is not to be deemed limited to such specific application, but is to be considered as extending to all fields involving like problems and conditions.

In preparing string beans for canning, it is customary to remove the end portions, i. e., the stem end and the small reduced stringy tip portion on the blossom end. A primary purpose of my invention is to provide a machine for performing the snipping off of such end portions of string beans efficiently at a high rate of speed, so that a large quantity of such product may be prepared in a given period of time.

A further primary object of my invention is to provide a machine for such purpose having a plurality of knives, in which machine that part of the knives not desired to operate may be elevated automatically by the body of the bean itself, and that part of the knives desired to operate will be locked into cutting position, i. e., the beans themselves function to select the knives which are to remain in operative position.

The above mentioned general objects of my invention, together with others inherent in the same, are attained by the device illustrated in the following drawings, the same being preferred exemplary forms of embodiment of my invention, throughout which drawings like reference numerals indicate like parts:

Figure 1 is a front view in perspective of a device embodying my invention;

Fig. 2 is a view in longitudinal section;

Fig. 3 is an enlarged view in perspective of a knife with its co-operating guard and automatic locking means;

Fig. 4 is an enlarged view in front elevation of a plurality of knives for cutting off one end portion;

Fig. 5 is a view in front elevation of a plurality of knives for cutting off the other end portion of the beans;

Fig. 6 is a view in front elevation of the hook mounting means;

Fig. 7 is an enlarged fragmentary view in perspective of the hook mounting means; and Fig. 8 is a view of a modified form of knife.

In a frame 9 an endless belt 10 is operatively mounted on the rollers 11 and 12, which in turn are mounted on shafts 13 and 14. A suitable driving means such as a pulley 15 is keyed to shaft 14 for driving the belt 10. Immediately above the belt 10 slats 16 longitudinally disposed are preferably positioned and extend to the first set of knives next hereinafter referred to. Also operatively disposed above the endless belt 10 a set of knife members 17 to 38 is operatively rotatively mounted on shaft 39, which shaft is mounted as respects its end portions in plates 40, which in turn may rest on the top of frame 9. A second set of such knife members 41 to 62 is mounted in shaft 63, which shaft is located immediately in front of the said first set, said sets of knives being of identical construction with the exception that the knife element is on a side of the guard in one side opposite to that in the other, as will hereinafter be more fully explained. The second set of knife members has its end portions mounted in plates 40. A fixed knife 63a is located at the extreme end of the forward set and a similar knife (not shown) is located on the opposite plate in the rearward set of knives.

A knife member, for example 17, as herein considered comprises a curved arm forming a guard 64, which may be integrally formed with a horizontal arm 65 having a notch 66, on the end portion of which horizontal arm 65 a knife element 67 may be vertically mounted, said knife element being of such length as to extend to a point just above the moving belt 10. The horizontal arm part 65 may be caused to rest upon a supporting rod 68 when in cutting position.

Each knife member has a cooperating locking means rotatively operatively mounted with respect thereto, said locking means comprising a vertically disposed arm 69 having a notch 70 on the rear side thereof to engage notch 66, said arm being rotatively mounted on shaft 71, and said arm may have integrally formed therewith a horizontally disposed arm 72 preferably having a small weight 73 formed on the end thereof to cause said locking device to operate positively automatically and quickly. In the forward set of knives the arm 69 of the locking means is on the left hand side of the horizontal arm 65. This provides for bringing the knife 67 of a knife member, for example 55 of the front set, close to the guard 64 of knife member 54 (see Fig. 4). In the rearward set of knives, the arm 69 of the locking means is on the right hand side of the knife member horizontal arm 65, so that this brings the knife 67 of a knife member, for example 22, close to the guard 64 of knife member 23 (see Fig. 5). It is immaterial on which side of the knife said guard is located in a given set of knives provided it is on the side opposite to that of the other set of knives. The endless belt 10 is provided with a plurality of bean gripping projecting arms or hooks 74, which serve to hold the string beans transversely of the belt and force or draw them between the knives. These hooks 74 are preferably mounted in a plate 75 which may be riveted to the belt 10 (see Figs. 6-7).

The plate 75 may be provided with openings 76 to permit the end portion of the depending arm 69 and the knife to pass therethrough. The forward portion of this plate 75 preferably inclines downwardly to the belt 10 to form fingerlike projections 77 so that the bean may be slightly elevated as it is caused to move back against the hooks 74 as clearly appears in Figs. 7 and 1. It will be noted that the knife element 67 may be quickly removed for sharpening. A bar 78 may be provided between the rearward and forward set of knives with depending wires 79 which extend nearly to the belt 10, said wires functioning to press the beans against the hooks 74 after said beans have passed through said knives.

In the modified form shown in Fig. 8 a circular form of knife 80 is illustrated. Its operation in general would be similar to the plate form 67.

In addition to the mode of operation already described above, the device embodying my invention operates as follows: The beans are fed from a hopper to the endless belt 10 in a position with their longitudinal axis transverse of the belt, no bean overlapping the next in any portion of its length, and the hooks 74 coming up behind the beans engage them and carry them forward. As the bean is forced forward, its main body portion is caused to engage the lower end portion of the vertically disposed arm 69 of the locking means and actuates this arm forward, thereby moving its notched portion 70 out of engagement with the notched portion 66 of the arm 65 of the knife member. This occurs as respects only such number of locking means as are engaged by the said body part of the bean. As the locking means is disengaged, the forward movement of the bean causes its body portion to contact the curved arm 64 of each knife member associated with said locking means. Upon engaging the said curved arm the knife member integrally connected therewith is elevated, rotating upon its shaft through a small arc.

Obviously, that guard member which is just beyond the end of the bean is not contacted by the bean body and therefore is not moved into unlocked position, and said adjacent knife member which may be 55, Fig. 4, is left in locked position and is not elevated. Therefore, the forward movement of the bean causes the end portion of the bean to move against the knife element 67 which is not unlocked and the knife snips off the end portion. Upon the bean passing beyond the curved guards 64, they immediately drop down and thereby allow the knives integrally formed therewith likewise to drop and the locking means then are caused to swing down and the notch 70 of each engages the notch 66 of the co-operating knife member, thereby rendering the knife member ready to be operated upon by the next row of beans forced thereunder by the next row of hooks 74. The small weight 73 at the end of the horizontal arm 72 of the locking member positively causes the vertically disposed arm integrally formed with said horizontal arm to drop down, causing the said notch portions to engage each other.

Manifestly, a certain space must obtain between the knives to provide room for the depending arm 69 of the locking means and also for the guard 64. The knife members are spaced about one-half inch apart for operating on beans because this spacing will about equal the maximum end portion to be cut or snipped off. Obviously, the set of knives having the knife positioned close to the right hand side of the guard 64 causes one end of the bean to be removed, while the set having the knife positioned close to the left hand side of the guard 64 causes the other end of the bean to be snipped off.

Obviously, changes may be made in the form, dimensions, and arrangement of the parts of my invention without departing from the principle thereof, the above setting forth only preferred forms of embodiment.

I claim:

1. A device of the character described embodying a product conveying belt; a plurality of cutting members disposed side by side and pivotally mounted above said belt, each of said members comprising a cutting means and an integrally formed elevating guard arm and mounting arm for said cutting means; and a locking means for said cutting members normally locking said members in cutting position, each of said locking means comprising a vertically disposed arm extending to a point just above said belt and a horizontally weighted arm, said vertical arm being engageable by the product being prepared to automatically release said locking means in order that when said elevating arm is subsequently contacted, said cutting members are automatically selectively held in non-cutting position by the product.

2. A device of the character described embodying a product conveying belt, having product engaging members mounted in spaced relation thereon; a plurality of cutting members disposed side by side and pivotally mounted above said belt, each of said members comprising a cutting means and an integrally formed elevating guard arm and mounting arm for said cutting means; and a locking means for said cutting members, each of said locking means comprising a vertically disposed arm extending to a point just above said belt and a horizontally weighted arm, said vertical arm being engageable by the product being prepared to automatically release said locking means in order that when said elevating arm is subsequently contacted, said cutting members are automatically selectively held in non-cutting position by the product.

3. In a device of the character described, a pivotally mounted knife member comprising a cutting means and an integrally formed elevating guard arm and mounting arm for said cutting means, said cutting means being rotatively mounted; and a locking means for said knife member comprising an arm extending into the path of the articles to be operated upon, said arm having a notch engageable with said knife member.

4. In a device of the character described, a pivotally mounted knife member comprising a cutting means which is rotatively mounted and an integrally formed elevating guard arm and mounting arm for said cutting means; and a locking means for said knife member comprising an arm extending into the path of the articles to be operated upon, said arm having a notch engageable with said knife member.

In witness whereof, I hereunto subscribe my name this 18th day of July, 1928.

JOHN FREEMAN JOHNSON.